(12) United States Patent
Rosendahl et al.

(10) Patent No.: US 6,203,115 B1
(45) Date of Patent: Mar. 20, 2001

(54) CONTROL SYSTEM FOR A VEHICLE BRAKING SYSTEM

(75) Inventors: Hartmut Rosendahl, Hannover; Bodo Klein, Barsinghausen; Wolfgang Stehr, Hannover; Christian Wiehen, Heppenheim; Stefan Klik, Hannover; Ingo Stumberg, Laatzen; Detlef Neuhaus, Hannover; Wolfgang Lichtenberg, Hannover; Jens Gröger, Hannover; Manfred Schult, Garbsen, all of (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 09/281,597

(22) Filed: Mar. 30, 1999

(30) Foreign Application Priority Data

Apr. 7, 1998 (DE) ................................. 198 15 440

(51) Int. Cl.[7] ............................. B60T 13/74; B60T 13/66
(52) U.S. Cl. .................................. 303/3; 303/20
(58) Field of Search ..................... 303/3, 15, 20

(56) References Cited

U.S. PATENT DOCUMENTS

| 4,818,036 | 4/1989 | Reinecke . |
| 5,129,712 | 7/1992 | Feldmann et al. . |
| 5,145,239 | 9/1992 | Meise et al. . |
| 5,255,962 | 10/1993 | Neuhaus et al. . |
| 5,599,072 | * 2/1997 | Feldmann ................................. 303/3 |
| 5,887,954 | * 3/1999 | Steiner et al. .................... 303/113.4 |
| 5,954,407 | * 9/1999 | Schramm et al. .................... 303/155 |
| 5,961,190 | * 10/1999 | Brandmeier et al. ................ 303/152 |
| 6,044,319 | * 3/2000 | Rosendahl et al. ................... 701/71 |

FOREIGN PATENT DOCUMENTS

| 32 30 970 | 2/1989 | (DE) . |
| 40 06 096 | 8/1991 | (DE) . |
| 195 43 583 | 2/1997 | (DE) . |
| 195 48 392 | 7/1997 | (DE) . |
| 0 373 315 | 6/1990 | (EP) . |
| 0 399 162 | 11/1990 | (EP) . |
| 0 467 112 | 1/1992 | (EP) . |

* cited by examiner

*Primary Examiner*—Christopher P. Schwartz
(74) *Attorney, Agent, or Firm*—Proskauer Rose LLP

(57) ABSTRACT

A control system for a vehicle braking systems includes an electronic control system and a brake signal transmitter having at least one circuit actuatable by a driver of the vehicle. Each circuit of the brake signal transmitter transmits an electrical brake signal having a value which is dependent upon an actuating force and/or an actuating stroke supplied to the brake signal transmitter. The electronic control system emits at least one electrical brake actuating signal which is dependent upon the electrical brake signal transmitted by the brake signal transmitter. An electronics block which includes at least a portion of the electronic control system is provided. The brake signal transmitter and the electronics block are integrated into a combined component.

3 Claims, 1 Drawing Sheet

CONTROL SYSTEM FOR A VEHICLE BRAKING SYSTEM

BACKGROUND OF THE INVENTION

The present invention relates to a control system for a vehicle braking system, and more particularly to a control system for a vehicle braking system of the type including a brake signal transmitter and an electronic control system, and in which the electronic control system emits at least one electrical brake actuating signal dependent upon a brake signal transmitted thereto by the brake signal transmitter in response to driver actuation of same.

A known control system of this type is depicted, for example, in FIG. 2 of German patent DE 32 30 970 A1. The brake signal transmitter disclosed therein transmits one electrical brake signal, and is therefore a single-circuit electrical system. The control electronics described in the above patent are comprised of several blocks, respectively designated as "an electronic control system," "a load-dependent switching element" and "an electronic switching element for anti-lock protection." The control system serves to control the application and braking effect of brakes distributed over the axles of the vehicle to be braked. An individual brake actuation signal for each axle is emitted at the outputs of the control electronics which are formed by the outputs of the last-mentioned electronic switching element for anti-lock protection. The values of the brake actuation signals are calculated by the control electronics based upon the value of the braking signal received from the brake signal transmitter, as well as upon signals received from load and wheel speed sensors. The brake actuation signals in the above disclosed control system are therefore not solely dependent on the braking signal. It is, however, also known practice to calculate a brake actuation signal, or all brake actuation signals, based exclusively on the braking signal.

The brake actuation signals are transmitted to electrically controlled energy distributors which, in turn, produce and deliver the brake application energy to the brakes, or supply the brakes with brake application energy from energy reserves, as indicated by the brake actuation signals. The brakes in turn produce braking forces with values dependent upon the supplied brake application energy.

For purposes herein, the physical nature of the term "brake application energy" is not intended to be strictly construed, but rather considered as a collective term for all physical phenomena which produce braking force when supplied to a brake. In the above-mentioned publication, the brake application energy is pressure provided in the form of compressed air. However, the pressure of some other gaseous or fluid pressure medium, or electrical phenomena such as current and voltage, can also be considered brake application energy within its intended meaning.

European patent EP 0 467 112 A2 (U.S. Pat. No. 5,255, 962) discloses a control system of the general type mentioned above which includes a two-circuit electrical brake signal transmitter, and in which the control electronics are divided into one or several central modules and wheel modules.

In the to be published German patent application DE 197 55 431.8, the wheel modules assigned to an axle are combined into an axle module.

From EP 0 399 162 B1 (U.S. Pat. No. 5,145,239), it is known to combine various components into a complete electronic control system.

In the vehicle industry it is customary to design and/or tune the components of the braking system, as well as the components of other vehicle systems, in specific relation to the application and/or operational conditions of the individual vehicle models or vehicle product line, with the goal of optimizing the operational behavior of the vehicles. For this reason, it is as a rule necessary to produce and store a wide variety of differently configured brake signal transmitters, as well as many variants of the control electronics of the control system mentioned above, resulting in considerable storage costs.

It is therefore an object of the present invention to provide a simple solution for lowering the storage costs of the various components of a control system for a vehicle braking system.

SUMMARY OF THE INVENTION

In accordance with these and other objects of the invention, there is provided a control system for a vehicle braking system which includes an electronic control system and a brake signal transmitter having at least one circuit actuatable by a driver of the vehicle. Each circuit of the brake signal transmitter transmits an electrical brake signal having a value which is dependent upon an actuating force and/or an actuating stroke supplied to the brake signal transmitter. The electronic control system emits at least one electrical brake actuating signal which is dependent upon the electrical brake signal transmitted by the brake signal transmitter. An electronics block which includes at least a portion of the electronic control system is provided. The brake signal transmitter and the electronics block are integrated into a combined component.

In addition to the considerable storage expenses mentioned above, the production and the storage of the many various components of the state of the art control systems also require a considerable amount of storage space. The invention makes it possible to reduce this requirement.

The separation of the brake signal transmitter and control electronics employed in heretofore known control systems requires electrical connections external of the brake signal transmitter as well as the control electronics, provided, for example, in the form of connection plugs with connection couplings for electrical connection of the brake signal transmitter with the control electronics. The invention makes it possible to reduce the number of these connections, for example, by as much as one-half. This aspect further results in a lowering of costs. By obviating the above-mentioned separation of brake signal transmitter from control electronics, the invention saves considerable installation space in the vehicle, providing further advantage.

Such external connections are also a potential source of disturbance, for example, if they allow access to moisture and/or dirt following improper repair or repair carried out under adverse conditions. The invention advantageously reduces this risk.

Electromagnetic radiation interference can also be introduced into the control system through the one or more external electrical connections between the brake signal transmitter and the control electronics, especially after improper repair. The invention removes this risk.

In many instances, the brake signal transmitter comprises a signal processing electronic system, possibly with a protective circuit, for the signals produced by its active element. An inductive or magneto-resistive stroke sensor can be used, for example, as the active element. The invention makes it possible to simplify and combine the signal processing electronic system with the internal portion of the control electronics and to achieve further cost reduction in this manner. A printed circuit according to the state of the art assigned to the signal processing electronic system can, for example, be integrated into a printed circuit of the control electronics, and can thus be dispensed with.

In state of the art control systems, the portion of the control electronics which, according to the present invention are contained in the electronics block and combined with the brake signal transmitter, are often installed at a location remote from the brake signal transmitter in the driver cabin. The required electrical connections often cause wire laying problems and/or additional costs, and may also have a negative influence on operational safety. The invention is also advantageous in this respect.

When the component according to the invention is installed on the driver cabin splash board, it can be used as a transmission point of signals into the driver cabin and to the undercarriage by using connection plugs leading to the inside and to the outside of the driver cabin. At the same time, data can also be transmitted from other systems, for example, from a drive pedal (gas pedal) sensor.

Often, the brake signal transmitter also includes a single-circuit or a multi-circuit pressure portion by which one or more pressures per pressure circuit, which are dependent on the actuating force and/or on the actuating stroke, are delivered from one or more pressure reserves. Delivery of such pressure or pressures serves for emergency actuation of the brakes in case of a failure in the control system or in the electrical parts of the components controlled by it, for example, the energy distributor. One check valve per pressure circuit is generally used for the retention of pressure while the installed electrical parts remain operationally intact, as shown or described, for example, in FIG. 2 of DE 32 30 970 A1 and in EP 0 399 162 B1 (U.S. Pat. No. 5,145,239), both mentioned before and incorporated herein by reference. Such a check valve, or several or all check valves, can be integrated into the component according to the invention in further developments of the invention for the purpose of additionally lowering costs.

The above, and other objects, features and advantages of the present invention will become apparent from the following description read in conjunction with the accompanying drawings, in which like reference numerals designate elements providing the same function.

DETAILED DESCRIPTION OF THE PREFERRED EMBODIMENT

Figure 1:
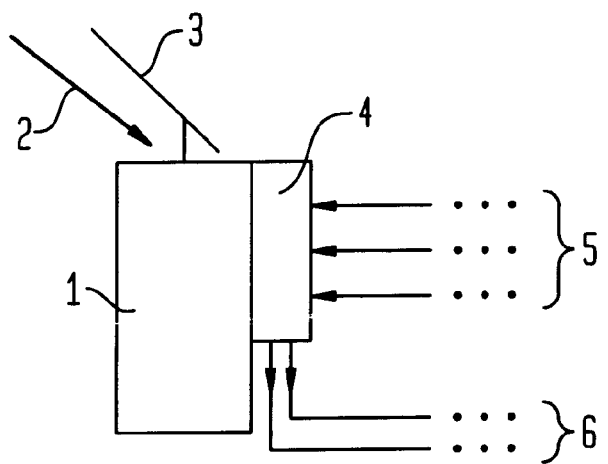
FIG. 1 is a schematic view of a component in accordance with an embodiment of the invention.

Referring now to the figures, and in particular FIG. 1, a component 2, depicted schematically, combines a brake signal transmitter 1 with an electronics block 4. The electronics block 4 may contain part of an electronic control system, or the complete electronic control system which, together with the brake signal transmitter 1, constitutes a control system of a vehicle braking system.

The brake signal transmitter 1 may be an electrical single-circuit brake signal transmitter 1 or, for enhanced safety, a multi-circuit brake signal transmitter 1. The brake signal transmitter may be actuated by a driver of the vehicle via an actuating element 3, represented conveniently in the form of a pedal, but which may also be suitably provided in a different form. Depending on the number of circuits provided therein, the brake signal transmitter 1 transmits one brake signal, or one brake signal per circuit, to the electronics block 4 when actuated via internal electrical connections when actuated. For the sake of clarity, a single-circuit brake signal transmitter is to be assumed in the description given below. Such a brake signal transmitter in accordance with a known design is disclosed for example in U.S. Pat. No. 4,818,036, which is incorporated herein by reference. It is to be understood that the disclosure stated below concerning the single brake signal transmitted by the brake signal transmitter 1 correspondingly applies also to the other brake signals in the case of a multi-circuit brake signal transmitter. The value of the brake signal emitted by the brake signal transmitter 1 is dependent upon the actuating force exerted by the driver on the actuating element 3 and/or upon the actuating stroke thereof.

In accordance with a basic embodiment of the invention, the portion of the electronic control system contained in the electronics block 4 calculates an output signal from the brake signal and emits the output signal as indicated in FIG. 1 by outgoing arrows 6. If the electronics block 4 contains the complete electronic control system, the output signal is in the form of a brake actuating signal which controls the braking force generation of one or several brakes via one or several energy distributors (not shown). When, however, the electronics block 4 contains only a portion of the electronic control system, the output signal is transmitted to one or several other parts of the electronic control system for the computation and output of the brake actuating signal. Depending upon the particular requirements of the vehicle to be braked and/or of the brakes themselves, the portion of the electronic control system contained in the electronics block 4 can be further developed in such manner that it emits several output signals or brake actuating signals.

The portion of the control electronics contained in the electronics block 4 can also be developed further to include additional signals transmitted to the electronics block 4 for use in the computation of the output signals or brake actuating signals. These signals, as indicated in FIG. 1 by the entering arrows 5, may come from sensors and/or from other electronic vehicle systems (not shown) which, depending on design, may in turn also receive sensor signals. Such additional signals can include, for example, load, rotational speed, deceleration, temperature, brake application energy, and wear signals. The inclusion of such signals may also take place in other parts of the electronic control system, when such are present.

Figure 2:
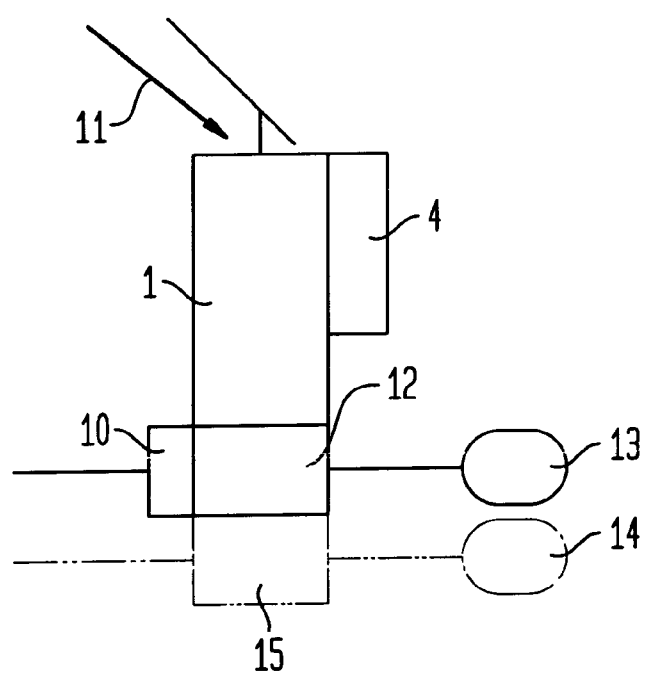
FIG. 2 is a schematic view of a further development of the embodiment of the component of FIG. 1.

Turning now to FIG. 2, a component 11 represents a further development of the previously described component 2, and in which regard the brake signal transmitter 1, 12 is expanded in the basic design by a pressure circuit 12. The pressure circuit 12 delivers pressure from a pressure supply 13 to the brakes (not shown) when the brake signal transmitter 1, 12 is actuated. The value of the delivered pressure, as in the case of the electrical brake signal, depends upon the actuating force exerted by the driver of the vehicle on the actuating element 3 and/or on the actuating stroke thereof. This pressure serves for emergency actuation of the brakes in the event of a defect in the control system or in the electrical parts of the components it controls, for example, in the energy distributors. A known such brake signal transmitter with an integrated pressure circuit is disclosed for example in European patent EP 0 373 315 A1 (U.S. Pat. No. 5,129,712), which is incorporated herein by reference.

It is customary to retain the pressure delivered by the pressure circuit by means of a check valve while the control electronics and the other electric parts of the brake system remain properly intact. In accordance with a conventional method, the check valve is actuated by the control electronics or by pressure controlled by the control electronics. A check valve actuated by pressure is known, for example, from the above-mentioned EP 0 399 162 B1.

The basic construction of the component 11 as disclosed above is further developed by integration of a check valve therewith, bearing reference numeral 10.

FIG. 2 also depicts, in broken lines, an additional further development, in which the brake signal transmitter 1, 12 is expanded by a second pressure circuit 15 which delivers pressure from an additional pressure supply 14 to correspondingly assigned brakes (not shown) when the brake signal transmitter 1, 12 is actuated.

This further development increases the safety potential of the vehicle to be braked by ensuring emergency braking, even in the event that a pressure circuit fails in addition to an electrical failure. A brake signal transmitter which is further developed in this manner can be produced, for example, by adding a second pressure circuit, as in the example shown in WABCO Westinghouse publication "Motorwagen-Bremsventil 461315", edition of September 1979 to the brake signal transmitter according to EP 0 399 162 B1. It is to be understood that although not depicted in the example of FIG. 2, the second pressure circuit can also be provided with a check valve, and that the latter can be integrated into the component 11.

The explanations applicable to one figure also apply generally to the remaining figure, directly or in corresponding application, to the extent that the above details are not in conflict with one another.

Having described preferred embodiments of the invention with reference to the accompanying drawing, it is to be understood that the invention is not limited to those precise embodiments, and that various changes and modifications may be effected therein by one skilled in the art without departing from the scope or spirit of the invention as defined in the appended claims.

What is claimed is:

1. A control system for a vehicle braking system, comprising:

an electronic control system;

a brake signal transmitter including at least one actuatable circuit, said at least one circuit transmitting to said electronic control system an electrical brake signal which is dependent upon an actuating force or an actuating stroke supplied to said brake signal transmitter;

said electronic control signal emitting at least one electrical brake actuating signal dependent upon the electrical brake signal;

an electronics block in which said electronic control system is entirely contained;

said brake signal transmitter and said electronics block being integrated into a combined component; and said electronic control system within said electronics block also receiving additional electrical signals including at least load signals and rotational wheel speed signals.

2. The control system according to claim 1, wherein the brake signal transmitter includes a pressure portion with at least one pressure circuit for supplying a pressure to each pressure circuit, said pressure being dependent upon the actuating force or the actuating stroke.

3. The control system according to claim 2, further comprising: for at least one of said pressure circuits, a check valve integrated into the combined component.

* * * * *